United States Patent
Huang-Fu et al.

(10) Patent No.: US 11,265,936 B2
(45) Date of Patent: *Mar. 1, 2022

(54) HANDLING QOS FLOW DESCRIPTION AND EPS BEARER OPERATION ERRORS IN 4G 5G SYSTEMS

(71) Applicant: MEDIATEK INC., Hsin-Chu (TW)

(72) Inventors: Chien-Chun Huang-Fu, Hsin-Chu (TW); Chi-Hsien Chen, Hsin-Chu (TW); Shang-Ru Mo, Hsin-Chu (TW)

(73) Assignee: MediaTek INC., Hsin-Chu (TW)

( * ) Notice: Subject to any disclaimer, the term of this patent is extended or adjusted under 35 U.S.C. 154(b) by 81 days.

This patent is subject to a terminal disclaimer.

(21) Appl. No.: 16/792,453

(22) Filed: Feb. 17, 2020

(65) Prior Publication Data

US 2020/0267780 A1  Aug. 20, 2020

Related U.S. Application Data

(60) Provisional application No. 62/806,927, filed on Feb. 18, 2019.

(51) Int. Cl.
*H04W 76/22* (2018.01)
*H04W 76/12* (2018.01)
(Continued)

(52) U.S. Cl.
CPC .......... *H04W 76/11* (2018.02); *H04W 76/10* (2018.02); *H04W 76/30* (2018.02)

(58) Field of Classification Search
CPC ..... H04W 76/11; H04W 76/10; H04W 76/30; H04W 76/22; H04W 76/12
See application file for complete search history.

(56) References Cited

U.S. PATENT DOCUMENTS

| | | | | |
|---|---|---|---|---|
| 2011/0103277 A1* | 5/2011 | Watfa | ................ | H04W 36/0033 370/310 |
| 2011/0310851 A1* | 12/2011 | Klingenbrunn | ....... | H04W 76/22 370/332 |
| 2020/0077317 A1 | 3/2020 | Sharma et al. | | |

FOREIGN PATENT DOCUMENTS

WO   WO2018202545 A1   5/2017

OTHER PUBLICATIONS

Bratislava, Sloakia 3GPP TSG CT WG1 Meeting #114 C1-190551, Jan. 21-25, 2019, 1-9 pgs.*

(Continued)

*Primary Examiner* — Joseph E Dean, Jr.
(74) *Attorney, Agent, or Firm* — Imperium Patent Works; Zheng Jin

(57) ABSTRACT

In a first novel aspect, UE receives a mapped EPS bearer context IE during a PDU session establishment or modification procedure. UE diagnoses whether an operation error occurs for a mapped EPS bearer context. If so, UE deletes the mapped EPS bearer context with a 5GSM cause. In a second novel aspect, UE receives a QoS flow description IE during a PDU session establishment or modification procedure. UE diagnoses whether an operation error occurs for a QoS flow description. If so, UE either rejects the modification command or deletes the QoS flow description with a 5GSM cause. In a third novel aspect, UE receives a QoS flow description IE during an EPS bearer activation or modification procedure. UE diagnoses whether an operation error occurs for a QoS flow description. If so, UE includes an ePCO/PCO IE with a 5GSM cause in an activation or modification accept message.

20 Claims, 6 Drawing Sheets

(51) Int. Cl.
*H04W 76/11* (2018.01)
*H04W 76/30* (2018.01)
*H04W 76/10* (2018.01)

(56) References Cited

OTHER PUBLICATIONS

Taiwan IPO, office action for the TW patent application 109105135 (no English translation is available) dated Jan. 25, 2021 (20 pages).
3GPP TS 24.501 V15.2.1 (Jan. 2019), 3rd Generation Partnership Project; Technical Specification Group Core Network and Terminals; Non-Access-Stratum (NAS) protocol for 5G system (5GS); Stage 3 (Release 15) Figure 6.3.2.2-1, 6.4.1.2.1, Table 8.3.7.1.1, 9.11.4.8.1, 9.11.4.12.1, Sections 6.1.4.1, 6.2.3, 6.3.2.2, 6.3.2.3, 6.3.2.4, 6.4.1.2, 6.4.1.3, 6.4.2, 6.4.2.1, 6.4.2.2, 7.1, 7.5.1, A.4.
C1-190551 3GPP TSG CT WG1 Meeting #114, MediaTek Inc., "Handling of QoS flow description without valid EPS bearer context", Bratislava, Slovakia, Jan. 21-25, 2019 (9 pages) section 6.1.4.1.
International Search Report and Written Opinion of International Search Authority for PCT/CN2020/075653 dated May 20, 2020 (10 pages).
C1-191544 3GPP TSG CT WG1 Meeting #115, Qualcomm Incorporated et al., "Updated of error handling for Mapped EPS bearer contexts IE", Montreal, Canada, Feb. 25-Mar. 1, 2019 (16 pages) section 6.3.2.3 and 6.4.1.3.
C1-191241 3GPP TSG CT WG1 Meeting #115, MediaTek Inc., "Handling on errors of QoS flow description operations", Montreal, Canada, Feb. 25-Mar. 1, 2019 (17 pages) section 6.3.2.4 and 6.4.1.3.
C1-190551 3GPP TSG CT WG1 Meeting #114, MediaTek Inc., "Handling of QoS flow description without valid EPS bearer context", Bratislava, Slovakia, Jan. 21-25, 2019 (9 pages) section 6.4.1.3.
C1-190581 3GPP TSG-CT WG1 Meeting #114, Huawei et al., "Correction to handling of #50 and #51", Bratislava, Slovakia, Jan. 21-25, 2019 (7 pages) section 6.4.1.3.

* cited by examiner

HANDLING QOS FLOW DESCRIPTION AND EPS BEARER OPERATION ERRORS IN 4G 5G SYSTEMS

CROSS REFERENCE TO RELATED APPLICATIONS

This application claims priority under 35 U.S.C. § 119 from U.S. Provisional Application No. 62/806,927, entitled "Enhancement of 4G 5G Inter-system Change", filed on Feb. 18, 2019, the subject matter of which is incorporated herein by reference.

TECHNICAL FIELD

The disclosed embodiments relate generally to wireless communication, and, more particularly, to method of handling Quality of Service (QoS) operation and EPS bearer operation errors in 5G new radio (NR) and 4G LTE systems.

BACKGROUND

The wireless communications network has grown exponentially over the years. A Long-Term Evolution (LTE) system offers high peak data rates, low latency, improved system capacity, and low operating cost resulting from simplified network architecture. LTE systems, also known as the 4G system, also provide seamless integration to older wireless network, such as GSM, CDMA and Universal Mobile Telecommunication System (UMTS). In LTE systems, an evolved universal terrestrial radio access network (E-UTRAN) includes a plurality of evolved Node-Bs (eNodeBs or eNBs) communicating with a plurality of mobile stations, referred to as user equipments (UEs). The $3^{rd}$ generation partner project (3GPP) network normally includes a hybrid of 2G/3G/4G systems. With the optimization of the network design, many improvements have developed over the evolution of various standards. The Next Generation Mobile Network (NGMN) board, has decided to focus the future NGMN activities on defining the end-to-end requirements for 5G new radio (NR) systems.

Quality of Service (QoS) indicates the performance from the perspective of network users. In LTE Evolved Packet System (EPS), QoS is managed based on EPS bearer in the Evolved Packet Core (EPC) and the Radio Access Network (RAN). In 5G network, QoS flow is the finest granularity for QoS management to enable more flexible QoS control. The concept of QoS flow is like EPS bearer. All types of traffic mapped to the same LIE EPS bearer or to the same 5G QoS flow receive the same level of packet forwarding treatment (e.g., scheduling policy, queue management policy, rate shaping policy, RLC configuration etc.) Providing different QoS forwarding treatment requires separate 5G QoS flow. Each QoS flow may include multiple QoS rules consisting of QoS profile, packet filters, and precedence order.

When a QoS flow is added, the network can provide a QoS flow description IE to the UE, which comprises a list of QoS flow descriptions. Each QoS flow description comprises a QFI, a QoS flow operation code, a number of QoS flow parameters, and a QoS flow parameters list. Each parameter included in the parameters list consists of a parameter identifier that identifies the parameter. One of the parameter identifiers is the EPS bearer identity (EBI), which is used to identify the EPS bearer that is mapped to or associated with the QoS flow. When a QoS flow is deleted, all the associated EPS bearer context information that are mapped from the deleted QoS flow should be deleted from the UE and the network. Further, when creating a new mapped EPS bearer, if an existing mapped EPS bearer having the same EBI is associated with a PDU session, then a collision occurs on the EPS bearer. When inter-system changes from 5GS to EPS, UE behavior is undefined on how to handle such collision. Other semantic errors may also occur when QoS flow description is created, deleted, nor modified during the operation.

For PDU session establishment and modification procedures in 5GS, and for EPS bearer activation and modification procedures in EPS, all those procedures involve operations where QoS flows and EPS bearers may be created, deleted, or modified. Accordingly, operation errors may occur. A solution is sought for UE to handle the operation errors.

SUMMARY

Methods for handling QoS flow description and mapped EPS bearer operation errors are proposed. In a first novel aspect, UE receives a mapped EPS bearer context IE during a PDU session establishment or modification procedure. UE diagnoses whether an operation error occurs for a mapped EPS bearer context. If so, UE deletes the mapped EPS bearer context with a 5GSM cause. In a second novel aspect, UE receives a QoS flow description IE during a PDU session establishment or modification procedure. UE diagnoses whether an operation error occurs for a QoS flow description. If so, UE either rejects the modification command or deletes the QoS flow description with a 5GSM cause. In a third novel aspect, UE receives a QoS flow description IE during an EPS bearer activation or modification procedure. UE diagnoses whether an operation error occurs for a QoS flow description. If so, UE includes an ePCO/PCO IE with a 5GSM cause in an activation or modification accept message.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
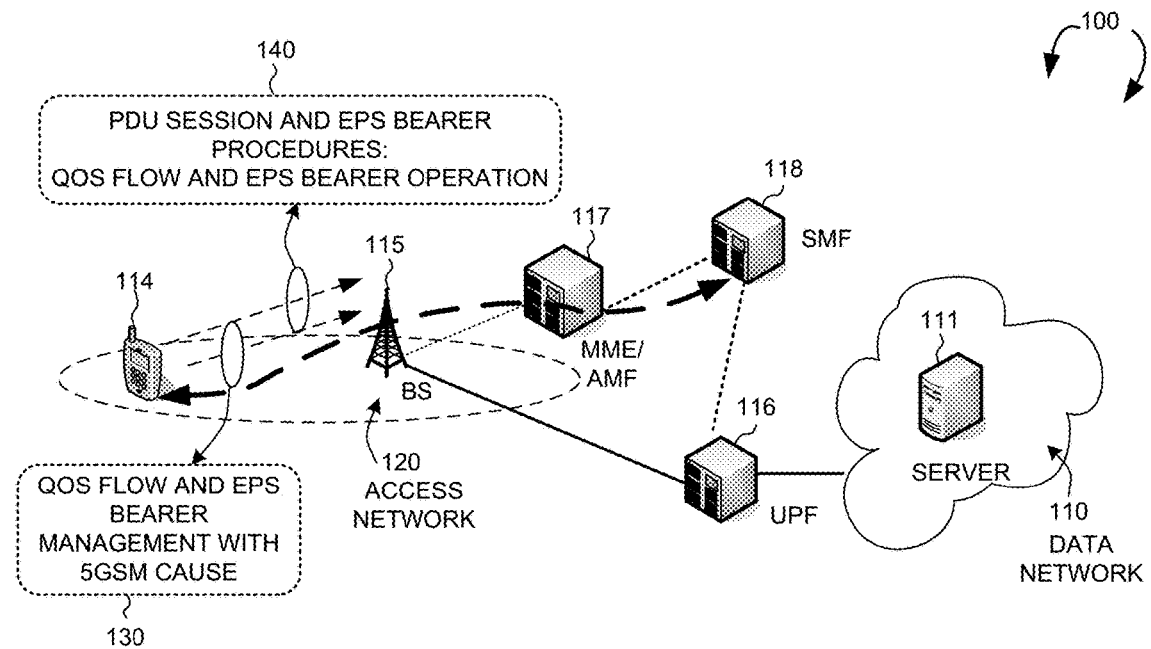
FIG. 1 illustrates an exemplary EPS/5GS network supporting Quality of Service (QoS) flow and EPS bearer management in accordance with one novel aspect.

FIG. 1 illustrates an exemplary EPS/5GS network 100 supporting Quality of Service (QoS) flow and Evolved Packet System (EPS) bearer management in accordance with one novel aspect. LTE/NR network 100 comprises data network 110 and application server 111 that provides various services by communicating with a plurality of user equipments (UEs) including UE 114. In the example of FIG. 1, UE 114 and its serving base station BS 115 belong to part of a radio access network RAN 120. RAN 120 provides radio access for UE 114 via a radio access technology (RAT). Application server 111 communicates with UE 114 through User Plane Function (UPF) 116 and BS 115. A mobility management entity (MME) or an access and mobility management function (AMF) 117 communicates with BS 115 for access and mobility management of wireless access devices in LTE/NR network 100. A Session Management Function (SMF) 118 is primarily responsible for interacting with the decoupled data plane, creating, updating and removing Protocol Data Unit (PDU) sessions and managing session context with UPF 116. UE 114 may be equipped with a radio frequency (RF) transceiver or multiple RF transceivers for different application services via different RATs/CNs. UE 114 may be a smart phone, a wearable device, an Internet of Things (IoT) device, and a tablet, etc.

In 5G, PDU session establishment is a parallel procedure of PDN connection procedure in 4G. A PDU session defines the association between the UE and the data network that provides a PDU connectivity service. Each PDU session is identified by a PDU session ID, and may include multiple QoS flows and QoS rules. The network or the UE can initiate different PDU session procedures, e.g., PDU session establishment, PDU session modification, and PDU session release procedures. In 5G network, QoS flow is the finest granularity for QoS management to enable more flexible QoS control. Each QoS flow is identified by a QoS flow ID (QFI) which is unique within a PDU session. Each QoS rule is identified by a QoS rule ID (QRI). There can be more than one QoS rule associated with the same QoS flow. A default QoS rule is required to be sent to the UE for every PDU session establishment and it is associated with a QoS flow. Within a PDU session, there should be one and only one default QoS rule.

When a QoS flow is added, the network can provide a QoS flow description IE to the UE, which comprises a list of QoS flow descriptions. Each QoS flow description comprises a QFI, a QoS flow operation code, a number of QoS flow parameters, and a QoS flow parameters list. Each parameter included in the parameters list consists of a parameter identifier that identifies the parameter. One of the parameter identifiers is the EPS bearer identity (EBI), which is used to identify the EPS bearer that is mapped to or associated with the QoS flow. When a QoS flow is deleted, all the associated EPS bearer context information that are mapped from the deleted QoS flow should be deleted from the UE and the network. Further, when creating a new mapped EPS bearer, if an existing mapped EPS bearer having the same EBI is associated with a PDU session, then a collision occurs on the EPS bearer. When inter-system changes from 5GS to EPS, UE behavior is undefined on how to handle such collision. Other semantic errors may also occur when QoS flow description is created, deleted, nor modified during the operation.

For PDU session establishment and modification procedures in 5GS, and for EPS bearer activation and modification procedures in EPS, all those procedures involve operations where QoS flows and mapped EPS bearers may be created, deleted, or modified. Accordingly, operation errors may occur. In accordance with one novel aspect, UE 114 can detect the operation error and communicate with the network if needed. In the example of FIG. 1, UE 114 establishes or modifies a PDU session and performs a QoS or mapped EPS bearer operation via a PDU session establishment or modification procedure with the network over non-access stratum (NAS) layer signaling 140. Alternatively, UE 114 may perform EPS bearer activation or modification procedures. Upon receiving the QoS flow description IE and/or the mapped EPS bearer context IE, UE 114 detects whether there are any conflicts for the QoS and EPS bearer operation. UE 114 performs QoS and EPS bearer management as depicted by 130. If UE 114 diagnoses an operation error, then UE 114 may send 5GSM with cause value indicating the operation error.

Figure 2:
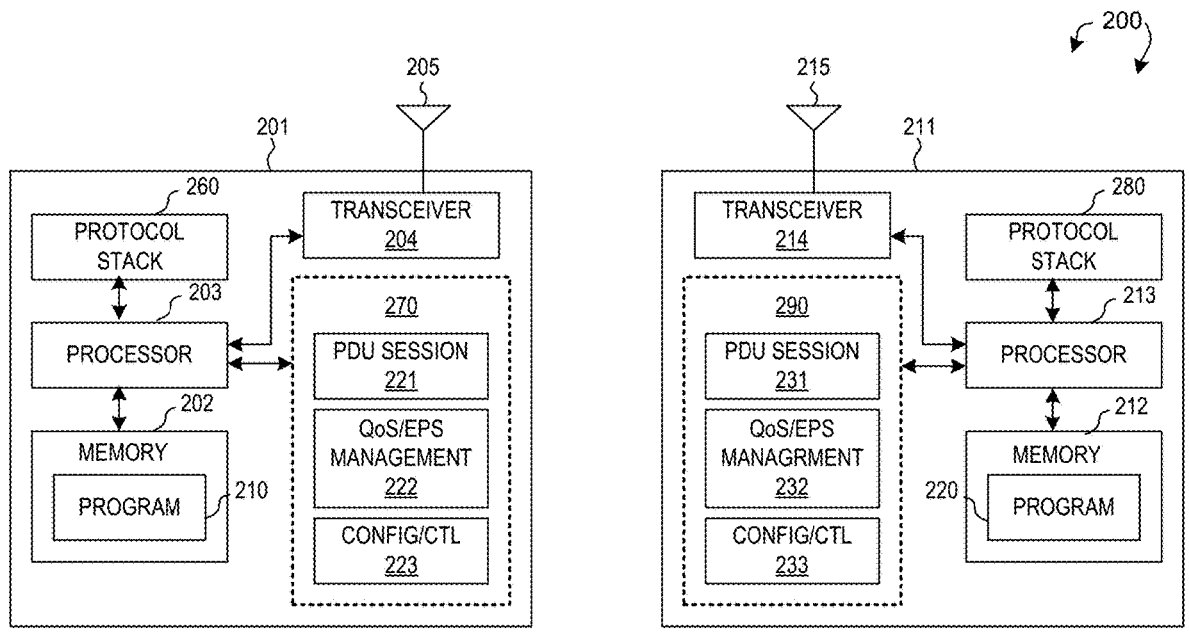
FIG. 2 illustrates simplified block diagrams of a user equipment (UE) in accordance with embodiments of the current invention.

FIG. 2 illustrates simplified block diagrams of wireless devices, e.g., a UE 201 and network entity 211 in accordance with embodiments of the current invention. Network entity 211 may be a base station combined with an MME or AMF. Network entity 211 has an antenna 215, which transmits and receives radio signals. A radio frequency RF transceiver module 214, coupled with the antenna, receives RF signals from antenna 215, converts them to baseband signals and sends them to processor 213. RF transceiver 214 also converts received baseband signals from processor 213, converts them to RF signals, and sends out to antenna 215. Processor 213 processes the received baseband signals and invokes different functional modules to perform features in base station 211. Memory 212 stores program instructions and data 220 to control the operations of base station 211. In the example of FIG. 2, network entity 211 also includes a set of control functional modules and circuit 290. PDU session handling circuit 231 handles PDU session establishment and modification procedures. QoS and EPS bearer management circuit 232 creates, modifies, and deletes QoS flow description and EPS bearers for UE. Configuration and control circuit 233 provides different QoS flow descriptions and EPS bearer parameters to configure and control UE.

Similarly, UE 201 has memory 202, a processor 203, and radio frequency (RF) transceiver module 204. RF transceiver 204 is coupled with antenna 205, receives RF signals from antenna 205, converts them to baseband signals, and sends them to processor 203. RF transceiver 204 also converts received baseband signals from processor 203, converts them to RF signals, and sends out to antenna 205. Processor 203 processes the received baseband signals and invokes different functional modules and circuits to perform features in UE 201. Memory 202 stores data and program instructions 210 to be executed by the processor to control the operations of UE 201. Suitable processors include, by way of example, a special purpose processor, a digital signal processor (DSP), a plurality of micro-processors, one or more micro-processor associated with a DSP core, a controller, a microcontroller, application specific integrated circuits (ASICs), file programmable gate array (FPGA) circuits, and other type of integrated circuits (ICs), and/or state machines. A processor in associated with software may be used to implement and configure features of UE 201.

UE 201 also comprises a set of functional modules and control circuits to carry out functional tasks of UE 201. Protocol stacks 260 comprise Non-Access-Stratum (NAS) layer to communicate with an MME or an AMF entity connecting to the core network, Radio Resource Control (RRC) layer for high layer configuration and control, Packet Data Convergence Protocol/Radio Link Control (PDCP/RLC) layer, Media Access Control (MAC) layer, and Physical (PHY) layer. System modules and circuits 270 may be implemented and configured by software, firmware, hardware, and/or combination thereof. The function modules and circuits, when executed by the processors via program instructions contained in the memory, interwork with each other to allow UE 201 to perform embodiments and functional tasks and features in the network. In one example, system modules and circuits 270 comprise PDU session handling circuit 221 that performs PDU session establishment and modification procedures with the network, a QoS and EPS bearer management circuit 222 that determines any conflict of QoS flow descriptions and mapped EPS bearer contexts and handles QoS flow and EPS bearer management by detecting semantic error and syntactical error, a config and control circuit 223 that handles QoS flow and EPS bearer config and control parameters.

Figure 3:
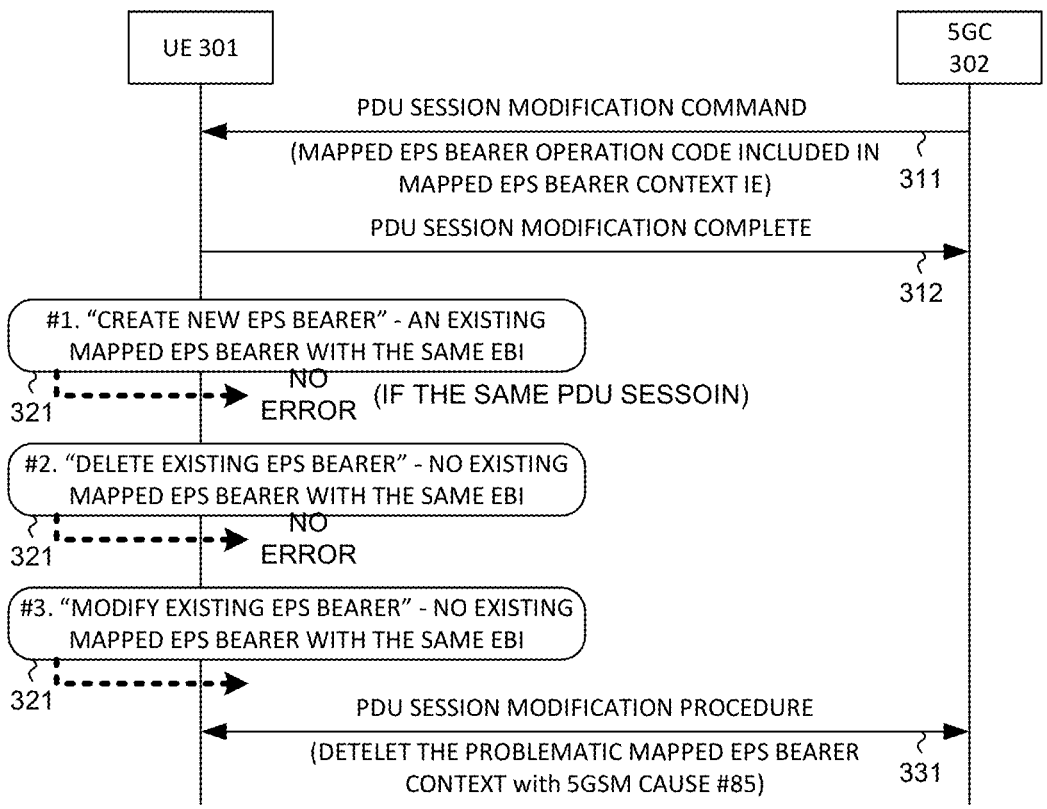
FIG. 3 illustrates one embodiment of mapped EPS bearer context operation with operation error for PDU session modification procedure in accordance with one novel aspect.

FIG. 3 illustrates one embodiment of mapped EPS bearer context operation with operation error for PDU session modification procedure in accordance with one novel aspect. For an already established PDU session, in step 311, UE 301 receives a PDU session modification command message, which carries instruction for UE 301 to add, delete, or modify mapped EPS bearer contexts (e.g., via mapped EPS bearer context IE). In step 312, UE 301 sends a PDU session modification complete message to network 302. UE 301 then checks the operation code of a mapped EPS bearer context having an EPS bearer ID (EBI) carried by the PDU session modification command. In scenario #1, the operation code="Create new EPS bearer" and there is already an existing mapped EPS bearer context with the same EBI. If the existing mapped EPS bearer context is associated with the PDU session that is being modified, the UE shall not diagnose an error, further process the create request and, if it was process successfully, delete the old EPS bearer context. Otherwise, after sending the PDU SESSION MODIFICATION COMPLETE for the ongoing PDU session modification procedure, the UE shall initiate a PDU session modification procedure by sending a PDU SESSION MODIFICATION REQUEST message to delete the mapped EPS bearer context with 5GSM cause #85 "Invalid mapped EPS bearer identity".

In scenario #2, the operation code ="Delete existing EPS bearer" and there is no existing mapped EPS bearer context with the same EBI associated with the PDU session that is being modified. The UE shall not diagnose an error, further process the delete request and, if it was processed successfully, consider the mapped EPS bearer context as successfully deleted. Note that the UE process the delete request may be implemented by the UE by making sure that no mapped EPS bearer context with the same EBI is included at the UE side. In Scenario #3, the operation code="Modify existing EPS bearer" and there is no existing mapped EPS bearer context with the same EBI associated with the PDU session that is being modified. After sending the PDU SESSION MODIFICATION COMPLETE for the ongoing PDU session modification procedure, in step 331, the UE shall initiate a PDU session modification procedure by sending a PDU SESSION MODIFICATION REQUEST message to delete the mapped EPS bearer context with 5GSM cause #85 indicating "Invalid mapped EPS bearer identity" for the operation.

Figure 4:
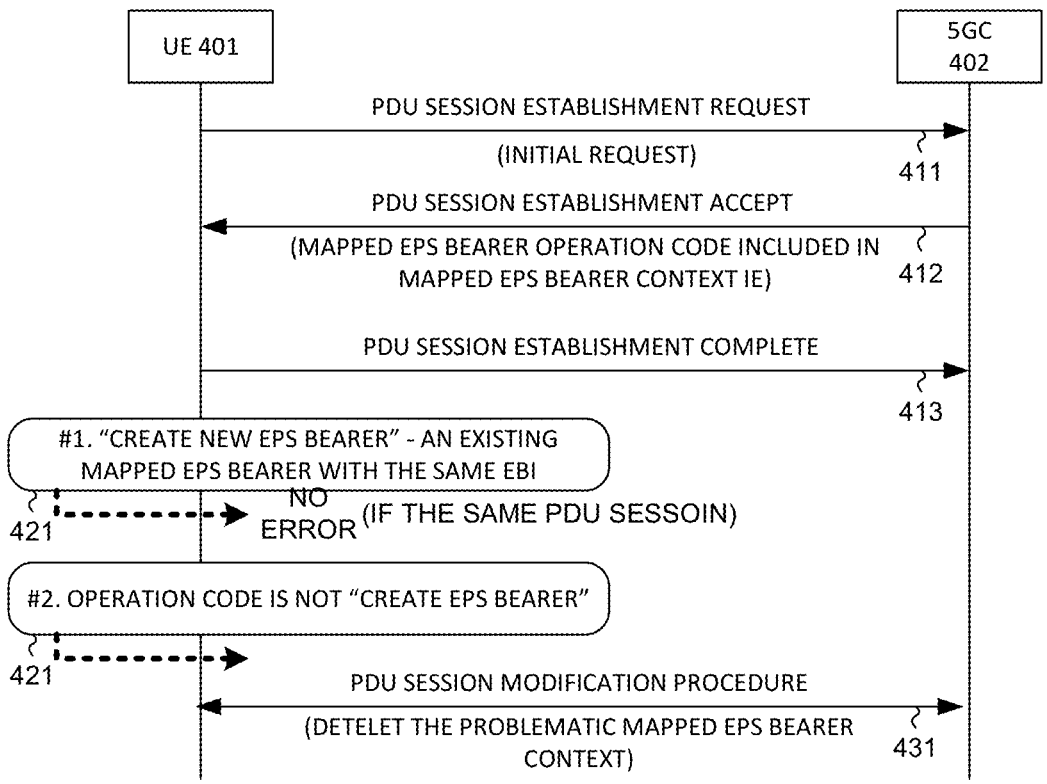
FIG. 4 illustrates one embodiment of mapped EPS bearer context operation with operation error for PDU session establishment procedure in accordance with one novel aspect.

FIG. 4 illustrates one embodiment of mapped EPS bearer context operation with operation error for PDU session establishment procedure in accordance with one novel aspect. In step 411, UE 401 sends a PDU session establishment request message to network 402. The request may indicate a request type for the to-be-established PDU session. In step 412, UE 401 receives a PDU session establishment accept message from network 402 to establish the PDU session. If the PDU session is successfully established, UE 401 sends a PDU session establishment complete message to network 402 in step 413. The UE NAS layer indicates the attributes of the established PDU session (e.g., PDU session ID (PSI), Service and Session Continuity (SSC) mode, Single-Network Slice Selection Assistance Information (S-NSSAI), Data Network Name (DNN), PDU session type, access type, PDU address, etc.), and provides information (e.g., PDU address) of the established PDU session to the upper layers. The PDU session establishment accept message carries instructions for UE 401 to create new mapped EPS bearer contexts (e.g., via mapped EPS bearer context IE).

UE 401 then checks the operation code of a mapped EPS bearer context having an EPS bearer ID (EBI) carried by the PDU session modification command. In scenario #1, the operation code is "Create new EPS bearer" and there is already an existing mapped EPS bearer context with the same EBI associated with any PDU session. if the existing mapped EPS bearer context is associated with the PDU session that is being established, the UE shall not diagnose an error, further process the create request and, if it was process successfully, delete the old EPS bearer context. Otherwise, in step 431, the UE shall initiate a PDU session modification procedure by sending a PDU SESSION MODIFICATION REQUEST message to delete the mapped EPS bearer context with 5GSM cause #85 "Invalid mapped EPS bearer identity".

In scenario #2, the operation code is an operation code other than "Create new EPS bearer" and the PDU session is being established with the request type set to "initial request" or "initial emergency request". In step 431, the UE shall initiate a PDU session modification procedure by sending a PDU SESSION MODIFICATION REQUEST message to delete the mapped EPS bearer context with 5GSM cause #85 "Invalid mapped EPS bearer identity". Note that the main purpose for the PDU session modification procedure is to delete the mapped EPS bearer context at the network side so that the EPS bearer is aligned.

Figure 5:
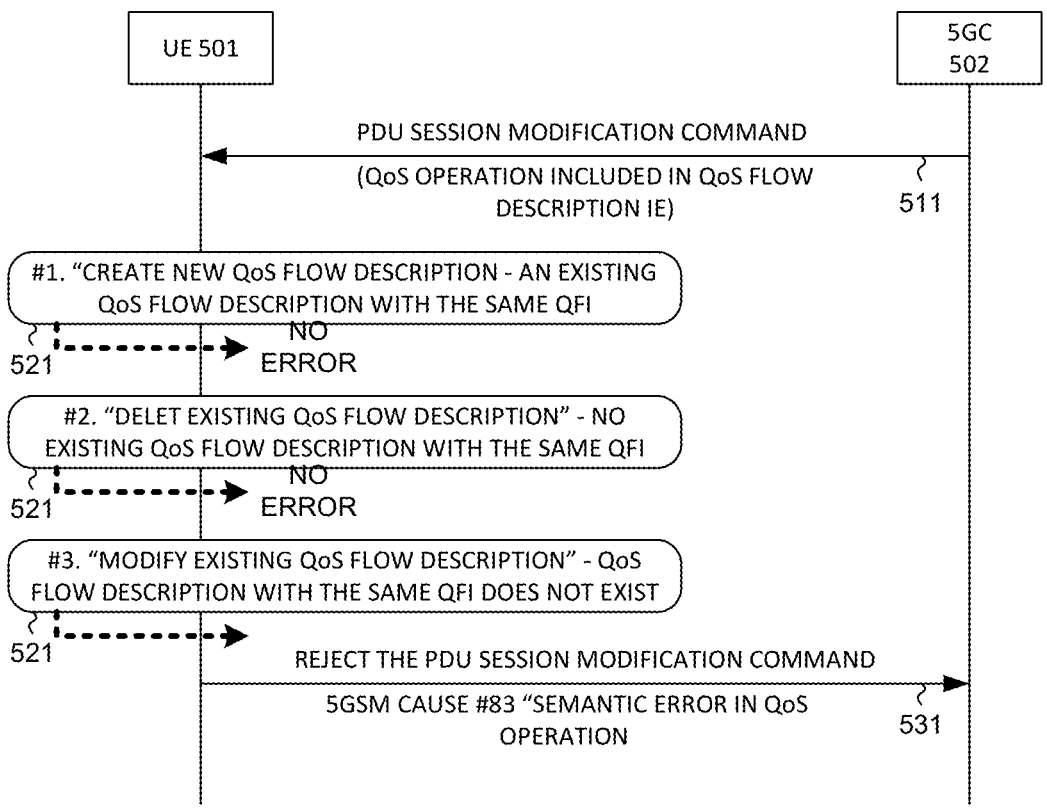
FIG. 5 illustrates one embodiment of QoS flow description operation with QoS operation error for PDU session modification procedure in accordance with one novel aspect.

FIG. 5 illustrates one embodiment of QoS flow description operation with QoS operation error for PDU session modification procedure in accordance with one novel aspect. For an already established PDU session, in step 511, UE 501 receives a PDU session modification command message, which carries instruction for UE 501 to add, delete, or modify QoS flow description (e.g., via QoS flow description IE). UE 501 then checks the operation code of a QoS flow description having a QFI carried by the PDU session modification command. In scenario #1, the operation code="Create new QoS flow description" and there is already an existing QoS flow description with the same QFI. The UE shall not diagnose an error, further process the create request and, if it was process successfully, delete the old QoS flow description. In scenario #2, the operation code="Delete existing QoS flow description" and there is no existing QoS flow description with the same QFI. The UE shall not diagnose an error, further process the delete request and, if it was processed successfully, consider the respective QoS flow description as successfully deleted. Note that the UE process the delete request may be implemented by making sure that no QoS flow description with the same QFI is included at the UE side. In Scenario #3, the operation code="Modify existing QoS flow description" and the associated QoS flow description does not exist. In step 531, UE 501 rejects the PDU SESSION MODIFICATION COMMAND message with 5GSM cause #83 "semantic error in the QoS operation". Note that when the UE is in 5GS and there is something wrong with corresponding 5GSM parameter, then the UE may reject the command from the network.

Figure 6:
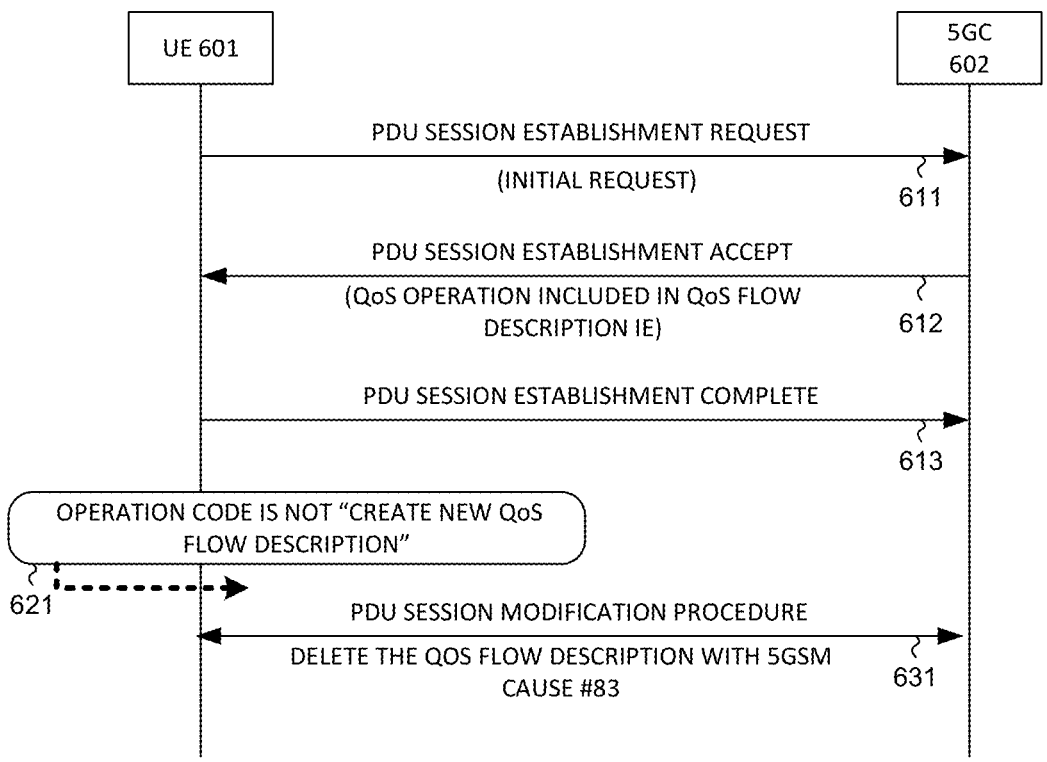
FIG. 6 illustrates one embodiment of QoS flow description operation with QoS operation error for PDU session establishment procedure in accordance with one novel aspect.

FIG. 6 illustrates one embodiment of QoS flow description operation with QoS operation error for PDU session establishment procedure in accordance with one novel aspect. In step 611, UE 601 sends a PDU session establishment request message to network 602. The request may indicate a request type for the to-be-established PDU session. In step 612, UE 601 receives a PDU session establishment accept message from network 602 to establish the PDU session. If the PDU session is successfully established, UE 401 sends a PDU session establishment complete message to network 402 in step 613. The PDU session establishment accept message carries instructions for UE 401 to create new QoS flow description (e.g., via QoS flow description IE). UE 601 then checks the operation code of a QoS flow description having a QFI carried by the PDU session modification command. In step 621, UE detects the operation code is other than "Create new QoS flow description", and the request type is "initial request" or "initial emergency request". In step 631, UE 601 sends a PDU SESSION MODIFICATION REQUEST message to delete the QoS flow description with 5GSM cause #83 "semantic error in the QoS operation". Note that the main purpose for the PDU session modification procedure is to delete the QoS flow description at the network side so that the QoS flow description is aligned.

Figure 7:
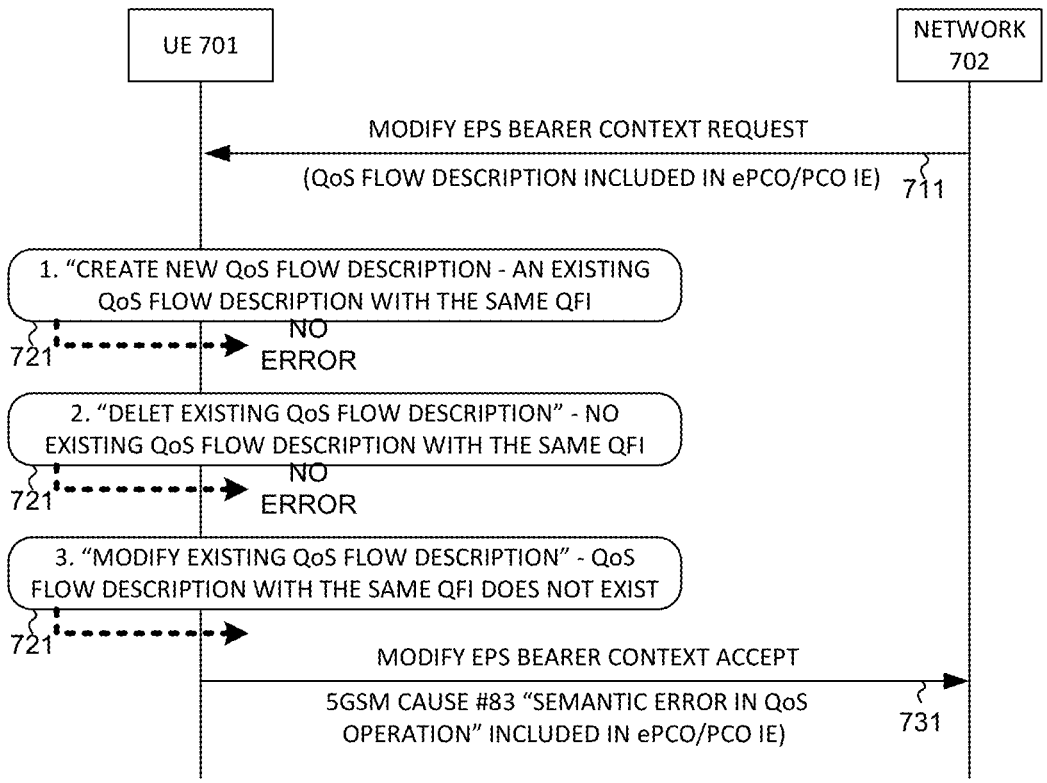
FIG. 7 illustrates one embodiment of QoS flow description operation with QoS operation error for EPS bearer context modification procedure in accordance with one novel aspect.

FIG. 7 illustrates one embodiment of QoS flow description operation with QoS operation error for EPS bearer context modification procedure in accordance with one novel aspect. In step 711, UE 701 receives an extended Protocol Configuration Options (ePCO)/PCO IE that carries a list of QoS flow descriptions from network 702. The ePCO/PCO IE may be contained in a modify EPS bearer context request message during an EPS bearer modification procedure of a PDN connection—to modify a QoS flow description having a QFI. In step 721, UE 701 checks the operation code of the QoS flow description carried by the EPS bearer modification command. In scenario #1, the operation code="Create new QoS flow description" and there is already an existing QoS flow description with the same QFI. The UE shall not diagnose an error, further process the create request and, if it was process successfully, delete the old QoS flow description. In scenario #2, the operation code="Delete existing QoS flow description" and there is no existing QoS flow description with the same QFI. The UE shall not diagnose an error, further process the delete request and, if it was processed successfully, consider the respective QoS flow description as successfully deleted. Note that the UE process the delete request may be implemented by the UE by making sure that no QoS flow description with the same QFI is included at the UE side. In Scenario #3, the operation code="Modify existing QoS flow description" and the associated QoS flow description does not exist. In step 731, UE 701 sends a MODIFY EPS BEARER CONTEXT ACCEPT message that includes an ePCO/PCO IE with a 5GSM cause parameter set to 5GSM cause #83 "semantic error in the QoS operation". Note that when the UE is in EPS and there is something wrong with 5GSM parameter, the UE will not reject the request from the network since 5G parameter does not impact the EPS procedure.

Figure 8:
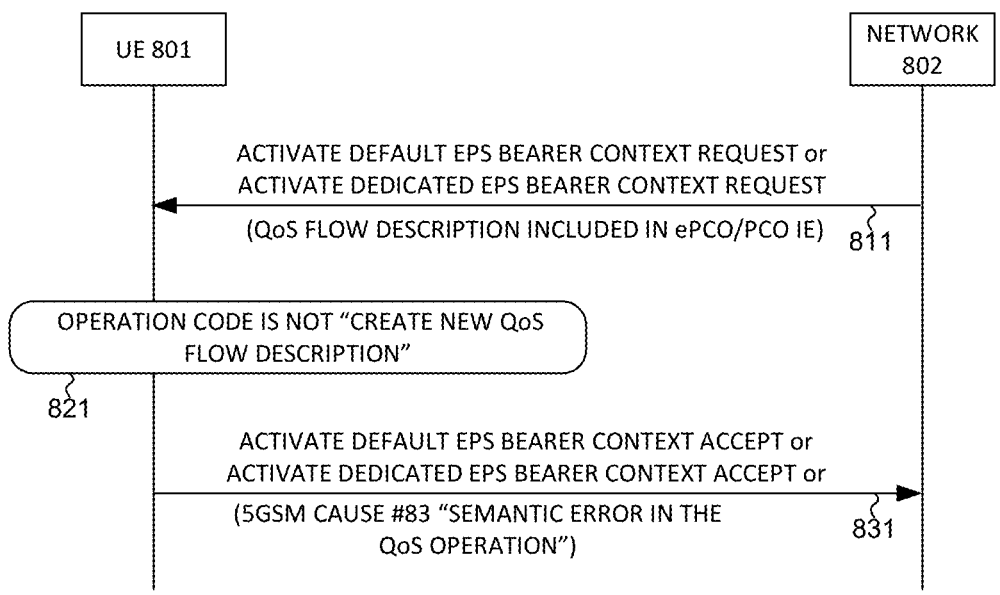
FIG. 8 illustrates one embodiment of QoS flow description operation with QoS operation error for EPS bearer context activation procedure in accordance with one novel aspect.

FIG. 8 illustrates one embodiment of QoS flow description operation with QoS operation error for EPS bearer context activation procedure in accordance with one novel aspect. In step 811, UE 801 receives an extended Protocol Configuration Options (ePCO)/PCO IE that carries a list of QoS flow descriptions from network 802. The ePCO/PCO IE may be contained in an activate default EPS bearer context request message or in an activate dedicated EPS bearer context request message during an EPS bearer activation procedure of a PDN connection—to create a new QoS flow description. In step 821, UE 801 checks the operation code of the QoS flow description carried by the EPS bearer activation command. When the flow description operation is an operation other than "Create new QoS flow description", in step 831, UE 801 includes an ePCO/PCO IE with a 5GSM cause parameter set to 5GSM cause #83 "semantic error in the QoS operation" in the ACTIVATE DEFAULT EPS BEARER CONTEXT ACCEPT or ACTIVATE DEDICATED EPS BEARER CONTEXT ACCEPT message.

Figure 9:
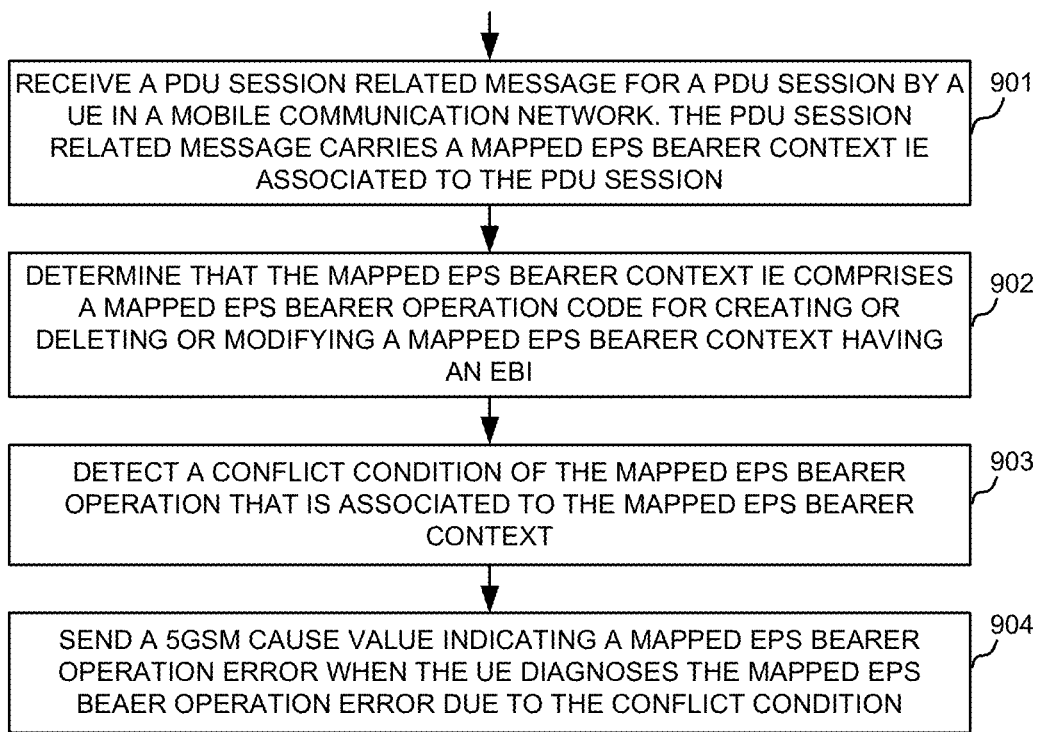
FIG. 9 is a flow chart of a method of EPS bearer management handling operation error during PDU session procedures in accordance with one novel aspect.

FIG. 9 is a flow chart of a method of EPS bearer management handling operation error during PDU session procedures in accordance with one novel aspect. In step 901, a UE receives a Protocol data unit (PDU) session related message for a PDU session in a mobile communication network. The PDU session related message carries a mapped evolved packet system (EPS) bearer context information element (IE) associated to the PDU session. In step 902, the UE determines that the mapped EPS bearer context IE comprises a mapped EPS bearer operation code for creating or modifying or deleting a mapped EPS bearer context having an EPS bearer identity (EBI). In step 903, the UE detects a conflicting condition of the mapped EPS bearer operation that is associated to the mapped EPS bearer context. In step 904, the UE sends a 5G session management (5GSM) cause value indicating a mapped EPS bearer operation error when the UE diagnoses the mapped EPS bearer operation error due to the conflicting condition.

Figure 10:
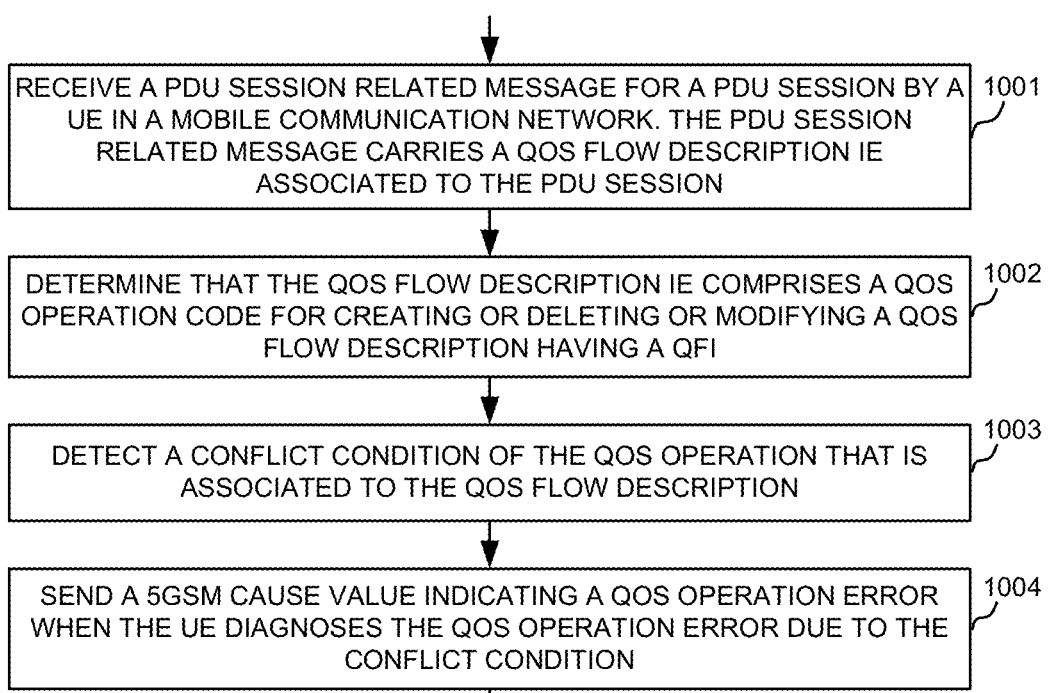
FIG. 10 is a flow chart of a method of QoS flow management handling operation error during PDU session procedures in accordance with one novel aspect.

FIG. 10 is a flow chart of a method of QoS flow management handling operation error during PDU session procedures in accordance with one novel aspect. In step 1001, a UE receiving a Protocol data unit (PDU) session related message for a PDU session in a mobile communication network. The PDU session related message carries a QoS flow description information element (IE) associated to the PDU session. In step 1002, the UE determines that the QoS flow description IE comprises a QoS operation code for creating or modifying or deleting a QoS flow description having a QoS flow description identity (QFI). In step 1003, the UE detects a conflicting condition of the QoS operation that is associated to the QoS flow description. In step 1004, the UE sends a 5G session management (5GSM) cause value indicating a QoS operation error when the UE diagnoses the QoS operation error due to the conflicting condition.

Figure 11:
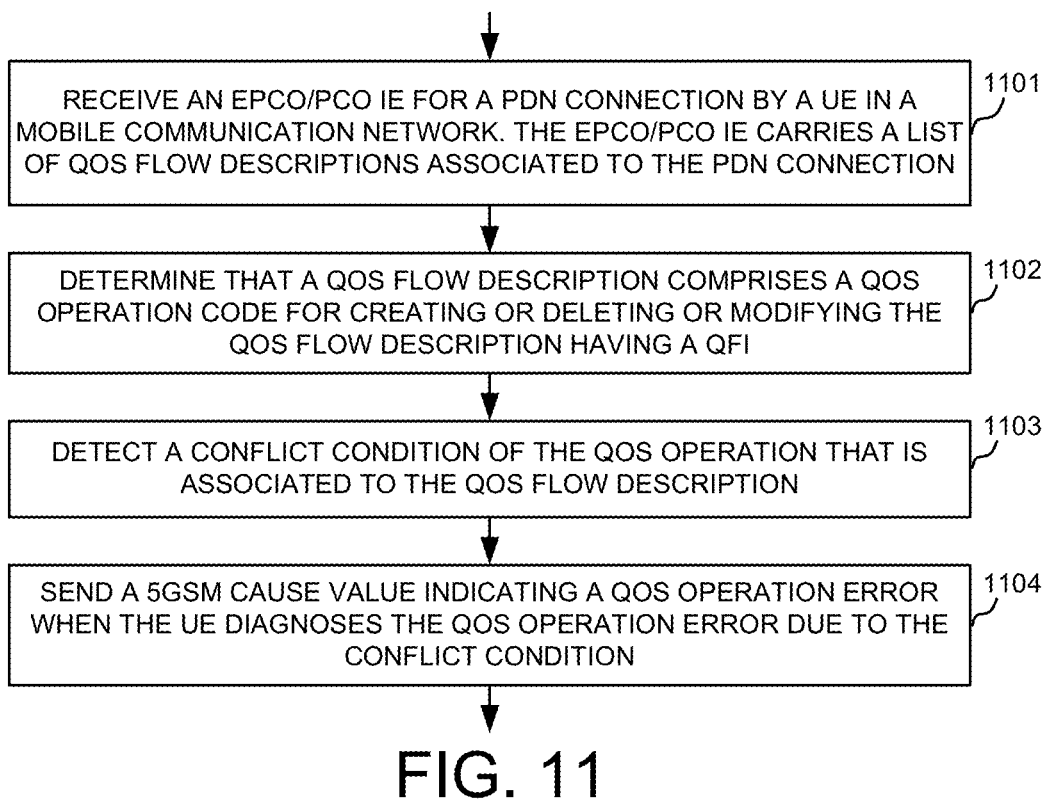
FIG. 11 is a flow chart of a method of QoS flow management handling operation error during EPS bearer procedures in accordance with one novel aspect.

FIG. 11 is a flow chart of a method of QoS flow management handling operation error during EPS bearer procedures in accordance with one novel aspect. In step 1101, a UE receives an extended Protocol Configuration Options (ePCO)/PCO information element (IE) for a Packet Data network (PDN) connection in a mobile communication network. The ePCO/PCO IE carries a list of Quality of Service (QoS) flow descriptions associated to the PDN connection. In step 1102, the UE determines that a QoS flow description comprises a QoS operation code for creating or modifying or deleting the QoS flow description of the PDN connection. In step 1103, the UE detects a conflicting condition of the QoS operation that is associated to the QoS flow description. In step 1104, the UE sends a 5G session management (5GSM) cause value indicating an error of the QoS operation when the UE diagnoses the QoS operation error due to the conflicting condition.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
receiving a Protocol data unit (PDU) session related message for a PDU session by a user equipment (UE) in a mobile communication network, wherein the PDU session related message carries a mapped evolved packet system (EPS) bearer context information element (IE) associated to the PDU session;
determining that the mapped EPS bearer context IE comprises a mapped EPS bearer operation code for creating or modifying or deleting a mapped EPS bearer context having an EPS bearer identity (EBI);
detecting a conflicting condition of the mapped EPS bearer operation that is associated to the mapped EPS bearer context; and
sending a 5G session management (5GSM) cause value indicating a mapped EPS bearer operation error when the UE diagnoses the mapped EPS bearer operation error due to the conflicting condition.

2. The method of claim 1, wherein the PDU session related message is a PDU session establishment accept message sent from the network in response to a PDU session establishment request message by the UE.

3. The method of claim 2, wherein the operation code is NOT "create new EPS bearer" and the PDU session establishment request message indicates an initial request type, and wherein the UE initiates a PDU session modification procedure with the network to delete the mapped EPS bearer context.

4. The method of claim 1, wherein the PDU session related message is a PDU session modification command message carries the mapped EPS bearer context IE.

5. The method of claim 4, wherein the operation code is "delete existing EPS bearer" and there is no existing EPS bearer with the same EBI, wherein the UE processes the delete request and does not diagnose any operation error.

6. The method of claim 4, wherein the operation code is "modify existing EPS bearer" and there is no existing EPS bearer with the same EBI, wherein the UE initiates another PDU session modification procedure to delete the mapped EPS bearer context with the 5GSM cause value.

7. A method, comprising:
receiving a Protocol data unit (PDU) session related message for a PDU session by a user equipment (UE) in a mobile communication network, wherein the PDU session related message carries a QoS flow description information element (IE) associated to the PDU session;
determining that the QoS flow description IE comprises a QoS operation code for creating or modifying or deleting a QoS flow description having a QoS flow description identity (QFI);
detecting a conflicting condition of the QoS operation that is associated to the QoS flow description; and
sending a 5G session management (5GSM) cause value indicating a QoS operation error when the UE diagnoses the QoS operation error due to the conflicting condition.

8. The method of claim 7, wherein the PDU session related message is a PDU session establishment accept message sent from the network in response to a PDU session establishment request message by the UE.

9. The method of claim 8, wherein the operation code is NOT "create new QoS flow description" and the PDU session establishment request message indicates an initial request type, wherein the UE initiates a PDU session modification procedure with the network to delete the QoS flow description.

10. The method of claim 7, wherein the PDU session related message is a PDU session modification command message carries the QoS flow description IE.

11. The method of claim 10, wherein the operation code is "create new QoS flow description" and there is an existing QoS flow description with the same QFI, wherein the UE deletes the existing QoS flow description upon successfully creates the new QoS flow description and does not diagnose any operation error.

12. The method of claim 10, wherein the operation code is "delete existing QoS flow description" and there is no existing QoS flow with the same QFI, wherein the UE processes the delete request and does not diagnose any operation error.

13. The method of claim 10, wherein the operation code is "modify existing QoS flow description" and there is no existing QoS flow with the same QFI, wherein the UE rejects the PDU session modification command message with the 5GSM cause value.

14. A method, comprising:
receiving an extended Protocol Configuration Options (ePCO)/PCO information element (IE) for a Packet Data network (PDN) connection by a user equipment (UE) in a mobile communication network, wherein the ePCO/PCO IE carries a list of Quality of Service (QoS) flow descriptions associated to the PDN connection;
determining that a QoS flow description comprises a QoS operation code for creating or modifying or deleting the QoS flow description of the PDN connection;
detecting a conflicting condition of the QoS operation that is associated to the QoS flow description; and
sending a 5G session management (5GSM) cause value indicating an error of the QoS operation when the UE diagnoses the QoS operation error due to the conflicting condition.

15. The method of claim 14, wherein the ePCO/PCO IE is carried by an activate default EPS bearer context request message or by an activate dedicated EPS bearer context request message.

16. The method of claim 15, wherein the operation code is NOT "create new QoS flow description", wherein the UE includes the 5GSM cause value in an activate default EPS bearer context accept message or by an activate dedicated EPS bearer context accept message.

17. The method of claim 14, wherein the ePCO/PCO IE is carried by a modify EPS bearer context request message.

18. The method of claim 17, wherein the operation code is "create new QoS flow description" and there is an existing QoS flow description with the same QFI, wherein the UE deletes the existing QoS flow description upon successfully creates the new QoS flow description and does not diagnose any operation error.

19. The method of claim 17, wherein the operation code is "delete existing QoS flow description" and there is no existing QoS flow with the same QFI, wherein the UE processes the delete request and does not diagnose any operation error.

20. The method of claim 17, wherein the operation code is "modify existing QoS flow description" and there is no existing QoS flow with the same QFI, wherein the UE includes the 5GSM cause value in a modify EPS bearer context accept message.

* * * * *